US010089053B2

(12) United States Patent
Gerlach et al.

(10) Patent No.: US 10,089,053 B2
(45) Date of Patent: Oct. 2, 2018

(54) MIRRORING DEEPLINKS

(71) Applicants: VOLKSWAGEN AG, Wolfsburg (DE); AUDI AG, Ingolstadt (DE)

(72) Inventors: Simon Gerlach, Hannover (DE); Lars Scholz, Braunschweig (DE); Henning Post, Braunschweig (DE)

(73) Assignees: Volkswagen AG (DE); Audi AG (DE)

( * ) Notice: Subject to any disclaimer, the term of this patent is extended or adjusted under 35 U.S.C. 154(b) by 70 days.

(21) Appl. No.: 14/449,218

(22) Filed: Aug. 1, 2014

(65) Prior Publication Data
US 2016/0034238 A1 Feb. 4, 2016

(51) Int. Cl.
*G06F 3/14* (2006.01)
*G06Q 30/02* (2012.01)
(Continued)

(52) U.S. Cl.
CPC ......... *G06F 3/1423* (2013.01); *G06F 3/0482* (2013.01); *G06F 3/04817* (2013.01); *G06F 3/04842* (2013.01); *G06Q 30/02* (2013.01); *G09G 5/003* (2013.01); *H04L 67/12* (2013.01); *H04W 4/80* (2018.02); *H04W 76/14* (2018.02); *G09G 2370/16* (2013.01)

(58) Field of Classification Search
None
See application file for complete search history.

(56) References Cited

U.S. PATENT DOCUMENTS

2002/0157041 A1* 10/2002 Bennett ................ H04L 69/329
714/43
2005/0119921 A1* 6/2005 Fitzgerald .......... G06Q 30/0645
705/5
(Continued)

FOREIGN PATENT DOCUMENTS

| CN | 101536469 A | 9/2009 |
|---|---|---|
| CN | 102243590 A | 11/2011 |

(Continued)

OTHER PUBLICATIONS

WikiHow, "How to Check in with the Yelp Mobile Application", http://www.wikihow.com/Check-in-with-the-Yelp-Mobile-Application, Nov. 2012.*

(Continued)

*Primary Examiner* — Matthew Yeung
(74) *Attorney, Agent, or Firm* — Barnes & Thornburg LLP

(57) ABSTRACT

An in-vehicle system for providing a driver with access to functionality of a mobile device that includes a head unit with an in-vehicle display for providing infotainment to the driver, software that configures the user interface with a graphical scheme native to the head unit, and a software interface by which the head unit can receive deep links from the mobile device. Deep links identify application contexts available within the mobile software applications, and are made available to a user from within in-vehicle software applications. When a user selects a deep link from within an in-vehicle software application, the deep link is followed and the appropriate application context is rendered by mobile device. The application context is then mirrored onto the in-vehicle display, where a driver can view and interact with it using mirroring technology.

32 Claims, 9 Drawing Sheets

(51) Int. Cl.
   G06F 3/0481  (2013.01)
   G06F 3/0482  (2013.01)
   G06F 3/0484  (2013.01)
   G09G 5/00    (2006.01)
   H04L 29/08   (2006.01)
   H04W 4/80    (2018.01)
   H04W 76/14   (2018.01)

(56) References Cited

U.S. PATENT DOCUMENTS

| | | | |
|---|---|---|---|
| 2005/0216824 A1* | 9/2005 | Ferguson | G06F 17/30867 715/205 |
| 2008/0082262 A1 | 4/2008 | Silva et al. | |
| 2011/0122074 A1* | 5/2011 | Chen | G01C 21/3688 345/173 |
| 2011/0246891 A1* | 10/2011 | Schubert | G06F 9/4445 715/719 |
| 2011/0247013 A1* | 10/2011 | Feller | G06F 21/44 709/219 |
| 2011/0282783 A1 | 11/2011 | Ferguson et al. | |
| 2012/0179325 A1* | 7/2012 | Faenger | B60K 35/00 701/31.4 |
| 2012/0238321 A1* | 9/2012 | Vialle | H04M 1/72519 455/556.2 |
| 2013/0166146 A1* | 6/2013 | Tanaka | G06F 3/0488 701/36 |
| 2014/0068010 A1* | 3/2014 | Nicholson | B60K 35/00 709/219 |
| 2014/0106726 A1 | 4/2014 | Crosbie et al. | |
| 2014/0129047 A1 | 5/2014 | Barrett | |
| 2014/0189396 A1* | 7/2014 | Miyahara | G06F 1/325 713/320 |
| 2014/0277937 A1* | 9/2014 | Scholz | G06F 7/00 701/36 |

FOREIGN PATENT DOCUMENTS

| | | |
|---|---|---|
| CN | 103442927 A | 12/2013 |
| KR | 1020090085119 | 8/2009 |
| KR | 101339005 | 12/2013 |
| TW | 201117982 A | 6/2011 |

OTHER PUBLICATIONS

Korean Office Action for Corresponding Korean Application No. 10-2015-0107694, dated Sep. 29, 2016.
Wikipedia; Mobile deep linking; downloaded from https://en.wikipedia.org/wiki/Mobile_deep_linking; Jul. 25, 2014.
Search Report for European Patent Application No. 15177273.8; dated Jun. 9, 2017.
Office Action for Chinese Patent Application No. 201510466044.8; dated Jan. 31, 2018.

\* cited by examiner

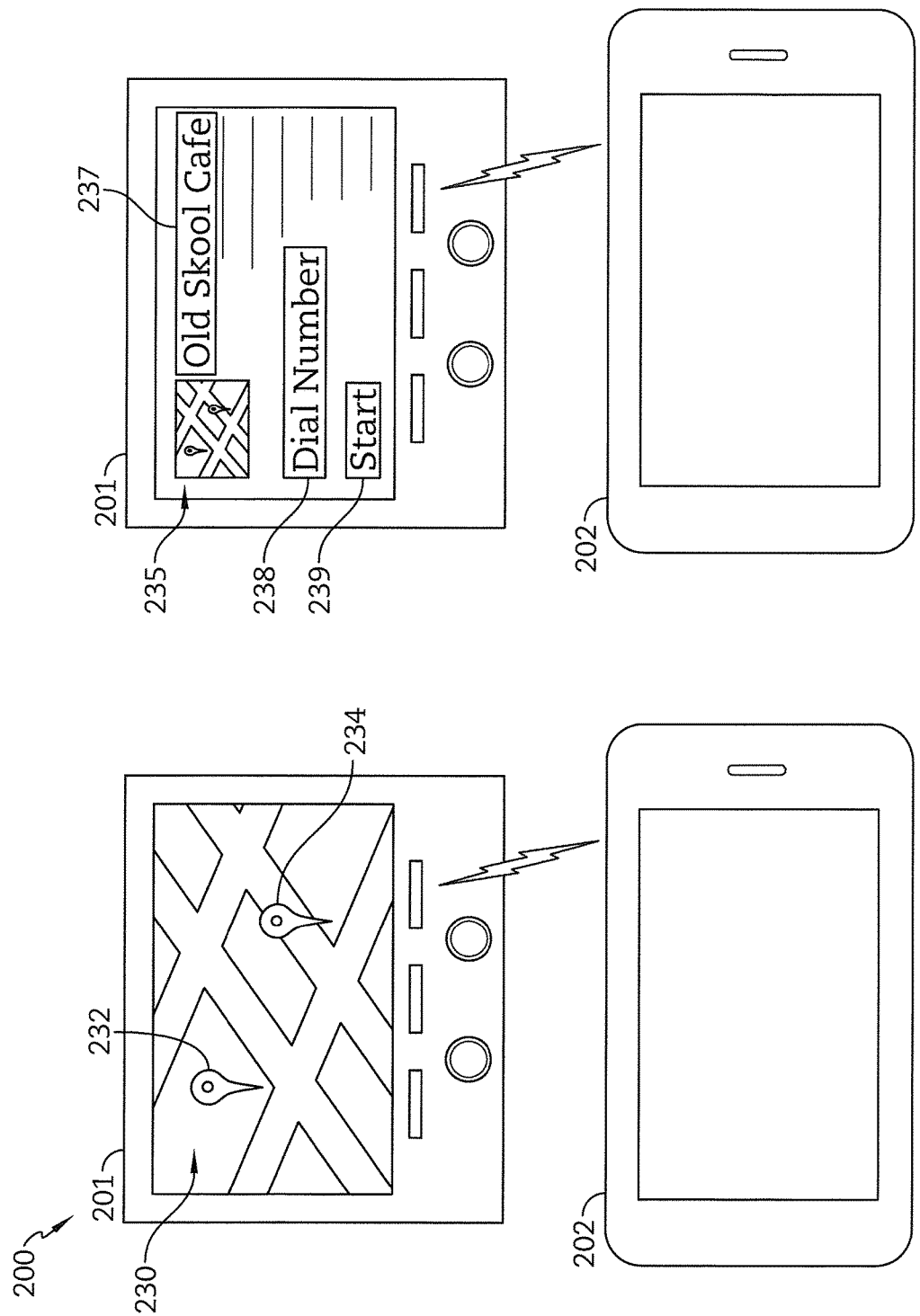

MIRRORING DEEPLINKS

BACKGROUND

The present disclosure relates to systems, components, and methodologies for making the functionality of mobile software applications available in an in-vehicle head unit. In particular, the present disclosure is directed to systems, components, and methodologies that better integrate functionality of mobile software applications stored on a mobile device with in-vehicle software.

SUMMARY

According to the present disclosure, systems, components, and methodologies are provided for making the functionality of mobile software applications available in an in-vehicle head unit.

Illustrative embodiments address technical problems associated with conventional methodologies by enabling mobile applications stored on a mobile device to deliver certain content from the mobile applications to an in-vehicle head unit using a communication protocol. In-vehicle applications can render the content sent by the mobile applications within user interfaces provided by the in-vehicle applications. The user interfaces provided by the in-vehicle applications may have a graphical scheme that provides a brand-specific look and feel.

Illustrative embodiments also enable the mobile applications to transmit deep links to the in-vehicle head unit. Deep links identify specific application contexts within the mobile applications. For example, a deep link may identify a specific email within a mobile email application, or a specific restaurant page within a mobile restaurant review application. After receiving the deep links from the mobile application using the above-described communication protocol, in-vehicle software can make the deep links available to a user of the in-vehicle head unit.

For example, a mobile restaurant review application may send a graphical icon associated with a particular restaurant to the in-vehicle head unit so that the in-vehicle navigation software can include the graphical icon on maps. The mobile restaurant review application may also send a deep link identifying the restaurant page within the mobile restaurant review application, and the in-vehicle navigation application may associate the deep link with the graphical icon. The user can select the graphical icon to follow the deep link.

In illustrative embodiments, when the user follows a deep link, the in-vehicle head unit initiates a mirroring protocol that establishes a connection with the mobile application associated with the deep link. The mobile application launches and navigates automatically to the specific application context identified by the deep link. For example, selection of a deep link may cause a mobile restaurant review application to launch and navigate automatically to a specific restaurant page. The mobile application renders the resulting application context (e.g., the restaurant page) on the display of the mobile device. The mirroring protocol then causes the in-vehicle head unit to mirror the display of the mobile device such that the application context identified by the deep link is visible to a user of the in-vehicle head unit.

Thus, illustrative embodiments enable functionality of mobile software applications to be accessible to users of in-vehicle head units from within in-vehicle software. Illustrative embodiments also enable users of in-vehicle head units to access relevant application contexts located deep within a mobile application directly from within in-vehicle software applications, without having to manually navigate through intermediate screens of the mobile application.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 1A shows a head unit with a home screen depicting three icons representing three respective in-vehicle applications, as well as one icon representing a MIRRORLINK™ interface for accessing mobile applications stored on a mobile device.

FIG. 1B shows a head unit displaying an application context rendered by an in-vehicle navigation application, in which "points of interest" are identified on a map.

FIG. 1C depicts a home screen of a mirroring protocol, such as MIRRORLINK™, to which a user navigates, in accordance with the conventional methodology, to access additional information about the points of interest identified on the map of FIG. 1B.

FIG. 1D shows a home screen of a mobile application having additional information about the points of interest identified on the map of FIG. 1b, and which is mirrored from the mobile device onto the head unit.

FIG. 1E depicts numerous other application contexts through which a user traverses, in accordance with the conventional methodology, to finally access information about the points of interest that were identified on the map of FIG. 1B.

FIGS. 2A-2D show an improved methodology by which a driver or passenger of a vehicle may use an in-vehicle head unit to access functionality from mobile applications stored on a mobile device in accordance with the disclosure.

FIG. 2A shows a head unit's home screen depicting icons for in-vehicle applications alongside icons for mobile software applications in accordance with the present disclosure, in which the icons for the mobile software applications may show an application's state or notifications from the application.

FIG. 2B shows a head unit displaying an application context rendered by an in-vehicle navigation application in which "points of interest" are identified on a map in accordance with the present disclosure.

FIG. 2C shows an application context rendered by an in-vehicle navigation application consisting of a "details" screen associated with a point of interest identified on the map of FIG. 2B in accordance with the present disclosure.

FIG. 2D shows an application context rendered by a mobile restaurant review application and mirrored onto a head unit, in which the application context consists of a specific restaurant page that was identified by a deep link, in accordance with the present disclosure.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

"Mirroring" or "tethering" technologies enable a driver or passenger of a vehicle to access functionality from mobile applications stored on a mobile device through in-vehicle information and entertainment ("infotainment") systems. Typically, mirroring technologies involve a mobile device in communication with a vehicle's head unit. When the mobile device renders a particular application context on its display, the mirroring technology may render that same application context on the display of the vehicle's head unit. With certain mirroring technologies, the vehicle's head unit may display a pixel by pixel copy of the application context rendered on the mobile device. Depending on the mobile device and/or mirroring technology being used, while a display is being mirrored onto the head unit, the mobile device may show the same application context as the head unit's display, but alternatively may simply show a blank screen or display a special icon.

The vehicle driver or passenger may interact with the application context as displayed on the head unit (e.g., through touch gestures, control knobs, etc.), and information about those gestures may be transmitted to the mobile application executing on the mobile device using the mirroring technologies. The mobile application may then process the interactions as if the interactions were being performed on the mobile device itself. In this fashion, the vehicle driver or passenger can access functionality of mobile applications stored on the mobile device through an in-vehicle head unit.

Examples of such mirroring technologies are MIRRORLINK™, GOOGLE™ AUTO LINK™, and APPLE™ CARPLAY™. These mirroring technologies, as conventionally deployed, have various drawbacks. Some of these drawbacks will be explained by way of a brief overview presented in connection with FIGS. 1A-1E, which show a conventional methodology through which a driver or passenger of a vehicle may use an in-vehicle head unit to access functionality from mobile applications stored on a mobile device.

Figure 1A:
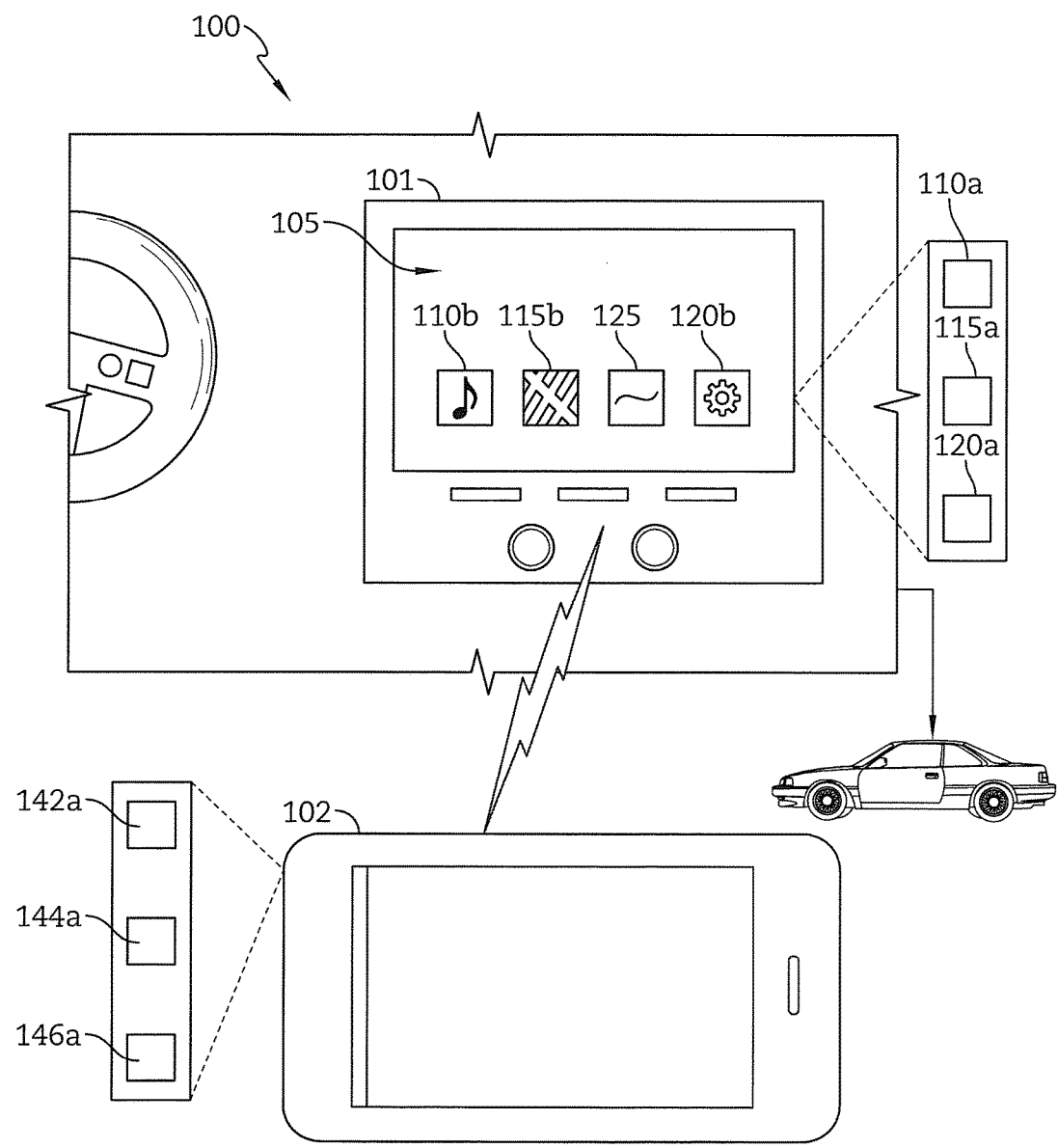
FIGS. 1A-1E show a conventional methodology by which a driver or passenger of a vehicle may use an in-vehicle head unit to access functionality from mobile applications stored on a mobile device.

More particularly, FIG. 1A shows a system 100 having a head unit 101 and a mobile device 102 communicatively coupled to the head unit 101. A head unit generally refers to any component or components that provide in-vehicle information and/or entertainment to drivers or passengers. The exemplary head unit 101 includes three in-vehicle applications stored on its memory, depicted by the blow-out shown in FIG. 1A: an in-vehicle audio application 110a, an in-vehicle navigation application 115a, and an in-vehicle settings application 120a. The mobile device 102 includes three mobile applications stored on its memory, also depicted by a blow-out in FIG. 1A: a gas price search application 142a, which in this example is a GASBUDDY™ application; a music application 144a, which in this example is a PANDORA™ application; and a review and recommendation application 146a, which in this example is a YELP™ application.

As depicted in FIG. 1A, the exemplary head unit 101 displays a home screen 105 that contains icons representing the three in-vehicle applications: an in-vehicle audio application icon 110b, an in-vehicle navigation application icon 115b, and an in-vehicle settings application icon 120b. The home screen 105 also includes an icon 25 for a mirroring protocol, which in this example is a MIRRORLINK™ icon 125, that provides an interface by which a user can access functionality from the mobile applications 142a, 144a, and 146a, as will be explained in more detail below.

Figure 1B:
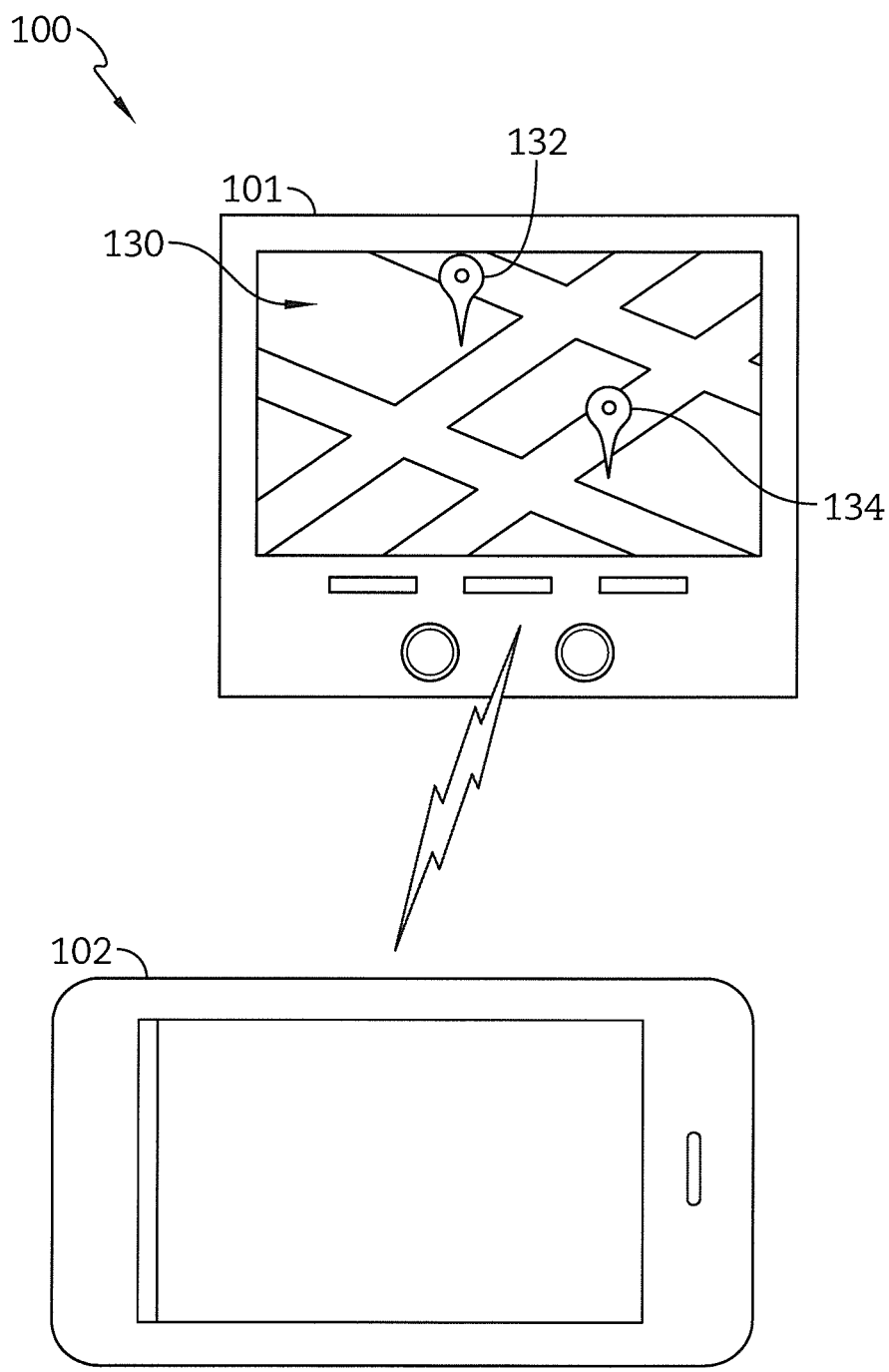

FIG. 1B shows the head unit 101 displaying an application context 130 rendered by the in-vehicle navigation application 115a. The in-vehicle navigation application 115a may be invoked after a user selects the in-vehicle navigation application icon 115b. The application context 130 includes a map showing a locale of interest to the vehicle's driver. FIG. 1B also shows two "points of interest" icons 132 and 134 rendered as part of the application context 130. The points of interest icons 132 and 134 may represent restaurants, tourist destinations, or other locations of interest to a user.

Where the point of interest icon 132 represents a restaurant, the driver may seek additional information about the restaurant from a mobile review and recommendation application 146a, such as the YELP™ application, stored on the mobile device 102. For example, the user may be interested in retrieving an application context of the mobile review and recommendation application 146a consisting of the restaurant page within the mobile review and recommendation application 146a. However, the user may not want to reach for the mobile device 102 and instead may want the application context from the mobile review and recommendation application 146a to be displayed by the head unit 101.

Under conventional methodology, the user will undertake numerous operations to retrieve the application context of interest from the mobile review and recommendation application 146a and have that application context rendered on the head unit 101. Specifically, the user may first exit the in-vehicle navigation application 115a and return to the home screen 105, shown in FIG. 1A. The user may then select the mirroring protocol icon 125. This may establish a protocol connection (e.g., a MIRRORLINK™ connection) between the mobile device 102 and the head unit 101, resulting in the head unit 101 mirroring the display of the mobile device 102.

Figure 1D:
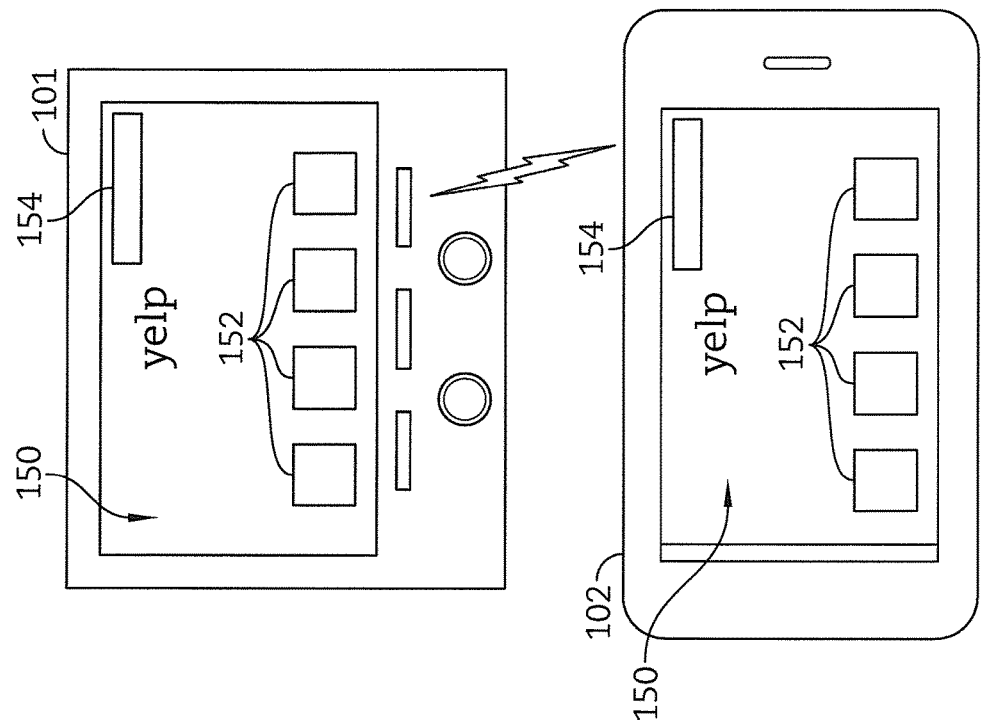
Figure 1C:
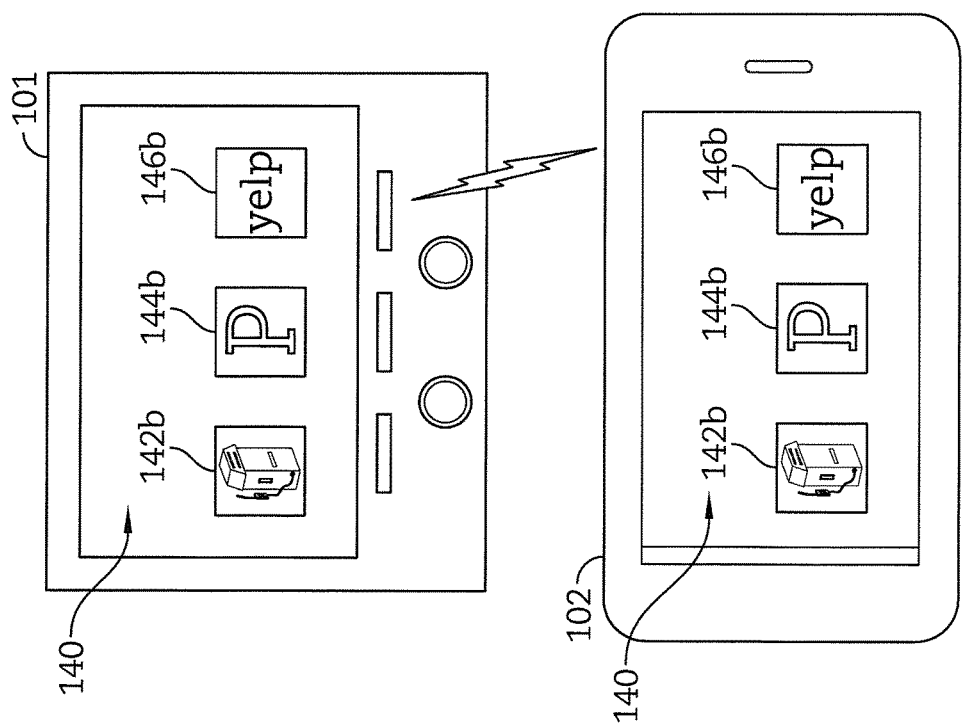

FIG. 1C shows a mirroring protocol screen 140 that appears after the user selects the mirroring protocol icon 125. The mirroring protocol screen 140 is rendered by the mobile device 102 and mirrored onto the head unit 101. The mirroring protocol screen 140 displays icons corresponding to mobile applications stored on the mobile device 102 that are compatible with the mirroring protocol, such as the mobile gas price search application icon 142b, the mobile music application icon 144b, and the mobile review and recommendation application icon 146b. The user can select the mobile review and recommendation application icon 146*b* on the head unit 101 to launch the mobile review and recommendation application 146*a*. The user's selection of the mobile review and recommendation application icon 146*b* is communicated to the mobile device 102 through mirroring protocols.

Figure 1E:
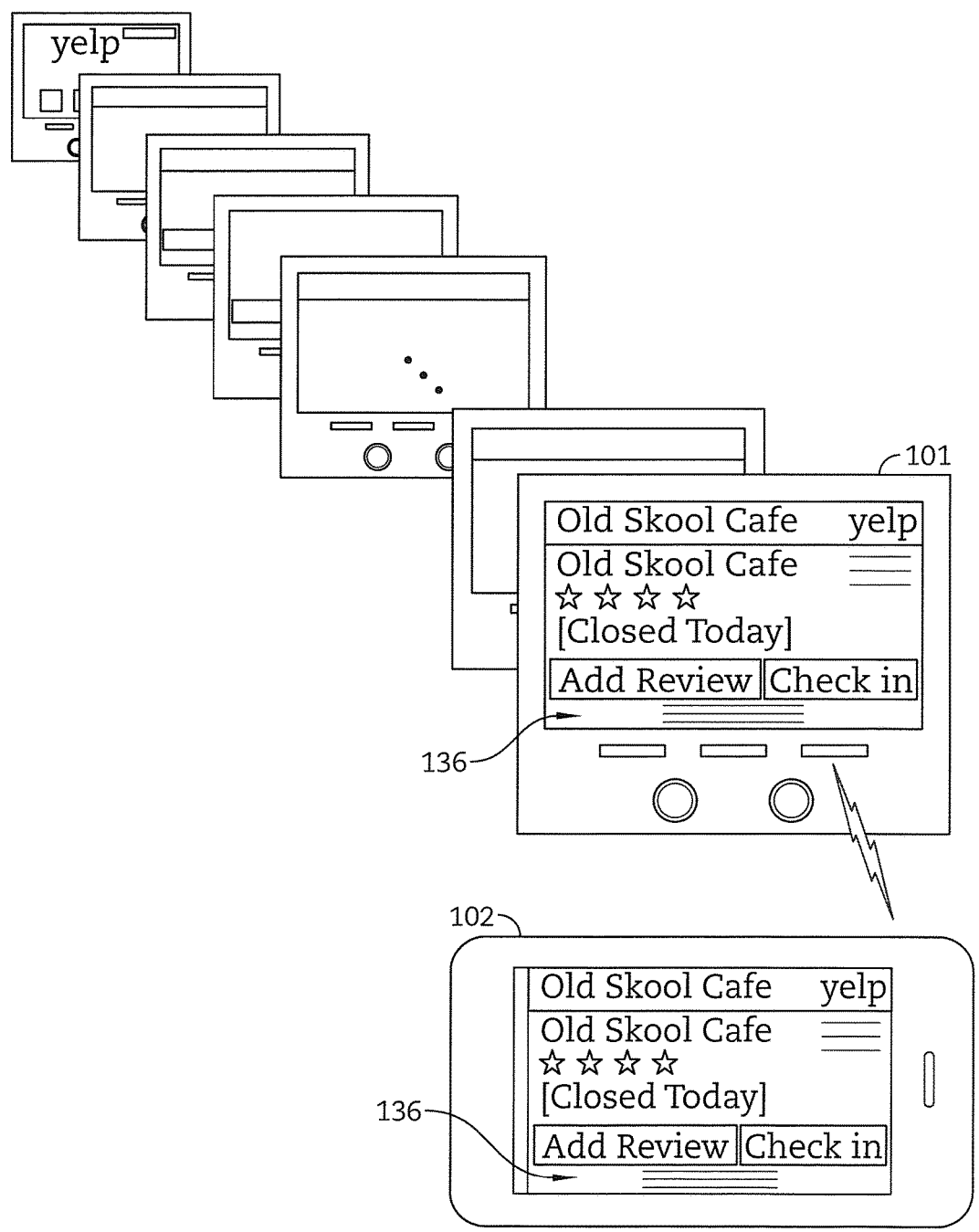

FIG. 1D shows a home screen 150 rendered by the review and recommendation application 146*a* on the device 102 and mirrored onto the head unit 101, which appears after the user selects the review and recommendation application icon 146*b*. The review and recommendation application home screen 150 includes navigation buttons 152 and a search field 154. The user may then use the navigation buttons 152, the search field 154, and other buttons or fields made available by the mobile review and recommendation application 146*a* to search for the restaurant associated with point of interest icon 132. In fact, FIG. 1E depicts that the user may need to traverse through multiple different application contexts consisting of various screens to finally access an application context 136 containing the restaurant page in the mobile review and recommendation application 146*a*.

After reviewing information about the restaurant within the application context 136, the user may wish to return to the in-vehicle navigation application 115*a*. The user may exit from the mobile review and recommendation application 146*a* to arrive at the mirroring protocol screen 140 (FIG. 1C), exit from the mirroring protocol screen 140 to arrive at the home screen 105 (FIG. 1A), and select the navigation application icon 115*b*.

The conventional methodology described in connection with FIGS. 1A-1E present several technical problems. In one aspect, the mobile application icons 142*b*, 144*b*, and 146*b* associated with the mobile applications 142*a*, 144*a*, and 146*a* are only visible to a user from the separate mirroring protocol (e.g., MIRRORLINK™) screen 140, not from application contexts provided by in-vehicle software. Thus, accessibility of the mobile applications 142*a*, 144*a*, and 146*a* is separated from in-vehicle software, including in-vehicle applications 110*a*, 115*a*, and 120*a*. This separation can lead to a diminished user experience. For example, whereas a user would expect all available features—whether drawn from an in-vehicle application or a mobile application—to be accessible from an integrated home screen, mobile applications accessible through the mirroring protocol technology are hidden behind the mirroring protocol icon 125.

In another aspect, functionality provided by the mobile applications are not available within in-vehicle application contexts. Moreover, in-vehicle applications do not have information regarding the logic, functionality, or content offered by the mobile applications, let alone a mechanism for accessing that logic, functionality, or content. For example, a user may want information about the restaurant associated with the point of interest icon 132 to be accessible from within the application context 130 of the in-vehicle navigation application 115*a*. However, in the example of FIGS. 1A-1E, a user exited the in-vehicle navigation application 115*a* entirely to access functionality from the mobile review and recommendation application 146*a*. This leads to a diminished user experience: functionality that should ordinarily be provided together in an integrated fashion is disconnected and disjointed.

In still another aspect, once a mirroring protocol (e.g., MIRRORLINK™) connection is established between the head unit 101 and the mobile device 102, a user may not want to traverse through numerous application contexts of the mobile application to arrive at an application context of interest. In the example of FIGS. 1A-1E, the user was interested in the application context 136 containing information about a specific restaurant (FIG. 1E). However, the user was not able to directly access the application context 136 from within the in-vehicle navigation application 115*a*. Instead, the user manually traversed through numerous application contexts (FIG. 1E) before arriving at the application context 136. Such manual traversal is time consuming and wasteful, and potentially dangerous for a driver that could become distracted.

An improved system through which a driver or passenger of a vehicle may use an in-vehicle head unit to access functionality from mobile applications stored on a mobile device will be summarized in connection with FIGS. 2A-2D. FIGS. 2A-2D show a system 200 that improves on the system 100 by integrating functionality of mobile applications within in-vehicle software. The system 200 achieves this, in part, by integrating deep links within in-vehicle software, where the deep links identify specific application contexts of interest within mobile applications.

Figure 2A:
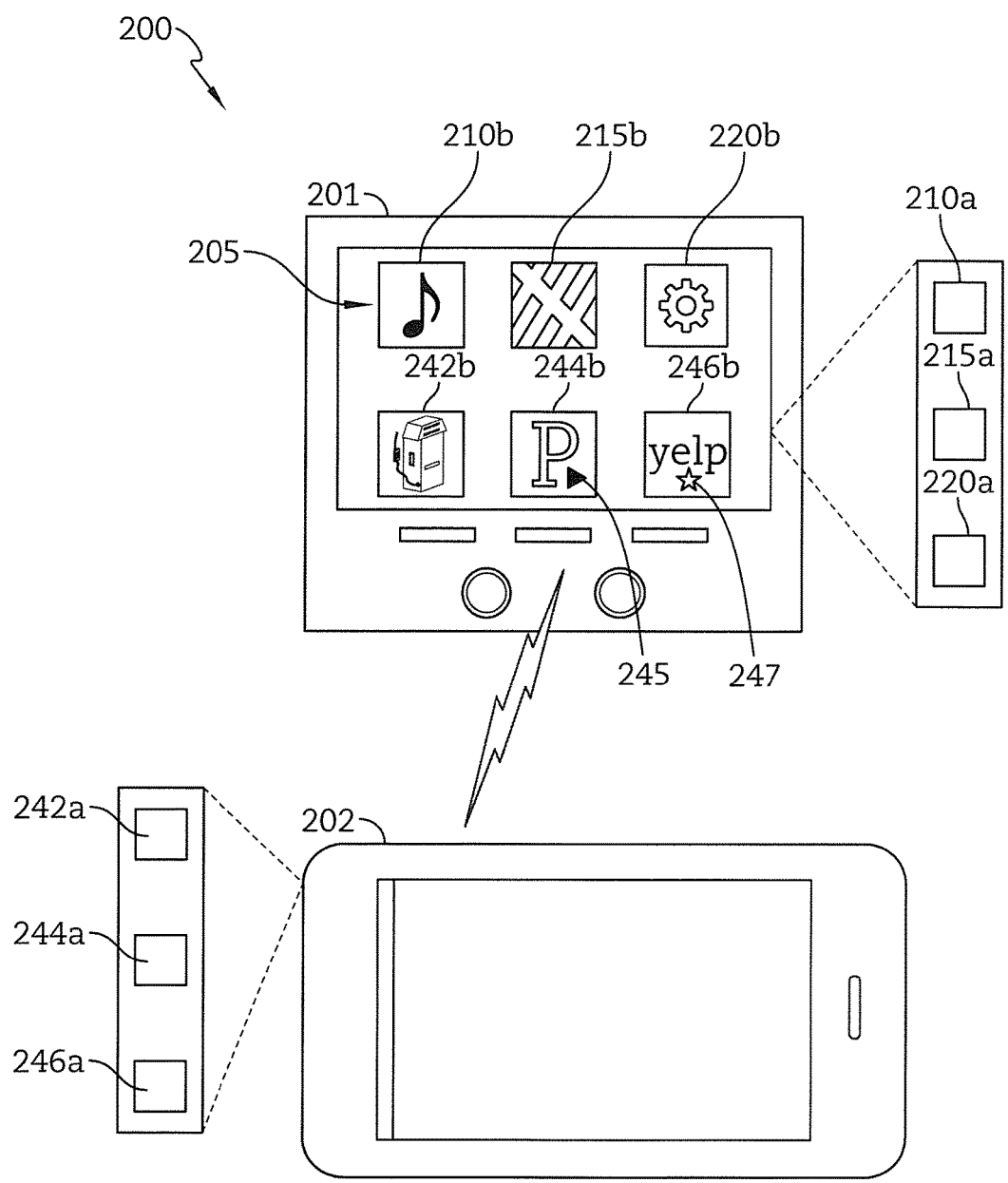

FIG. 2A shows that the system 200 has a head unit 201 and a mobile device 202 that is communicatively coupled to the head unit 201. The head unit 201 includes three in-vehicle applications similar to those described in connection with FIGS. 1A-1E: an in-vehicle audio application 210*a*, an in-vehicle navigation application 215*a*, and an in-vehicle settings application 220*a*. The mobile device 202 includes three mobile applications similar to those described in connection with FIGS. 1A-1E: a mobile gas price search application 242*a* (e.g., GASBUDDY™), a mobile music application 244*a* (e.g., PANDORA™), and a mobile review and recommendation application 246*a* (e.g., YELP™). The mobile music application icon 244*b* may include a state indicator 245, which in this example is a "Playing" indicator. The mobile review and recommendation application icon 246*b* may include a notification indicator 247. The state indicator 245 and notification indicator 247 will be described in more detail below. These applications are merely exemplary. Generally, the head unit 201 may include any number of applications suitable for use within a vehicle, and the mobile device 202 may include any number of mobile applications suitable for use on a mobile device.

In contrast to the home screen 105 shown in FIG. 1A, the head unit 201 displays a home screen 205 that includes not only icons for in-vehicle applications, but also icons for mobile applications. Particularly, the home screen 205 shows an in-vehicle audio application icon 210*b*, an in-vehicle navigation application icon 215*b*, an in-vehicle settings application icon 220*b*, a mobile gas price search application icon 242*b* (e.g., for GASBUDDY™), a mobile music application icon 244*b* (e.g., for PANDORA™), and a mobile review and recommendation application icon 246*b* (e.g., for YELP™). The mechanism by which the mobile application icons 242*b*, 244*b*, and 246*b* can be rendered alongside the in-vehicle application icons 210*b*, 215*b*, and 220*b* will be discussed in more detail below.

FIG. 2B shows the head unit 201 displaying an application context 230 rendered by the in-vehicle navigation application 215*a*. The in-vehicle navigation application 215*a* may be invoked after a user selects the in-vehicle navigation icon 215*b*. As shown in FIG. 2B, the in-vehicle navigation application 215*a* may display a map showing a locale of interest to the vehicle's driver. FIG. 2B also shows two "points of interest" icons 232 and 234 rendered as part of the application context 230. The points of interest icons 232 and 234 may represent restaurants, tourist destinations, or other locations of interest to a user. Methodology by which the points of interest icons 232 and 234 may be communicated to and rendered by the in-vehicle navigation application 215a will be discussed in more detail below.

Where the point of interest icon 232 represents a restaurant, the user may seek additional information about the restaurant. To do so, the user may select the point of interest icon 232 (e.g., by tapping it). FIG. 2C shows an application context 235 consisting of a "details screen" corresponding to the restaurant that may appear after a user selects the point of interest icon 232. The application context 235 may be rendered by the in-vehicle navigation application 215a, but may draw information about the restaurant from other sources, as will be discussed in more detail below.

The application context 235 may contain some general information about the selected restaurant, such as an address and telephone number. The user may also be able to perform certain actions using in-vehicle functionality from the application context 235. For example, the user could call the restaurant with an in-vehicle phone module (not shown) by selecting the "Dial number" button 238, or the user may select the "Start" button 239 to begin route guidance to the restaurant using the in-vehicle navigation application 215a.

However, the number of follow-up actions that can be provided this way is limited. The user may want to learn more about the restaurant than is displayed within the application context 235. For example, the user may want information about the restaurant that is only accessible through the mobile review and recommendation application 246a stored on the mobile device 202. Thus, the details screen 235 includes a button 237 for accessing information about the restaurant through the mobile review and recommendation application 246a.

The button 237 is different from the "Dial number" button 238 and the "Start" button 239 in that the button 237 invokes an application context provided by a mobile application stored on the mobile device 202, rather than simply invoking in-vehicle software. Particularly, upon selection of the button 237, the system 200 will initiate a connection using mirroring technology (e.g., MIRRORLINK™) to the mobile device 202, and follow a deep link (as will be explained in more detail below) to a specific application context 236 within the mobile YELP™ application 246a.

Figure 2D:
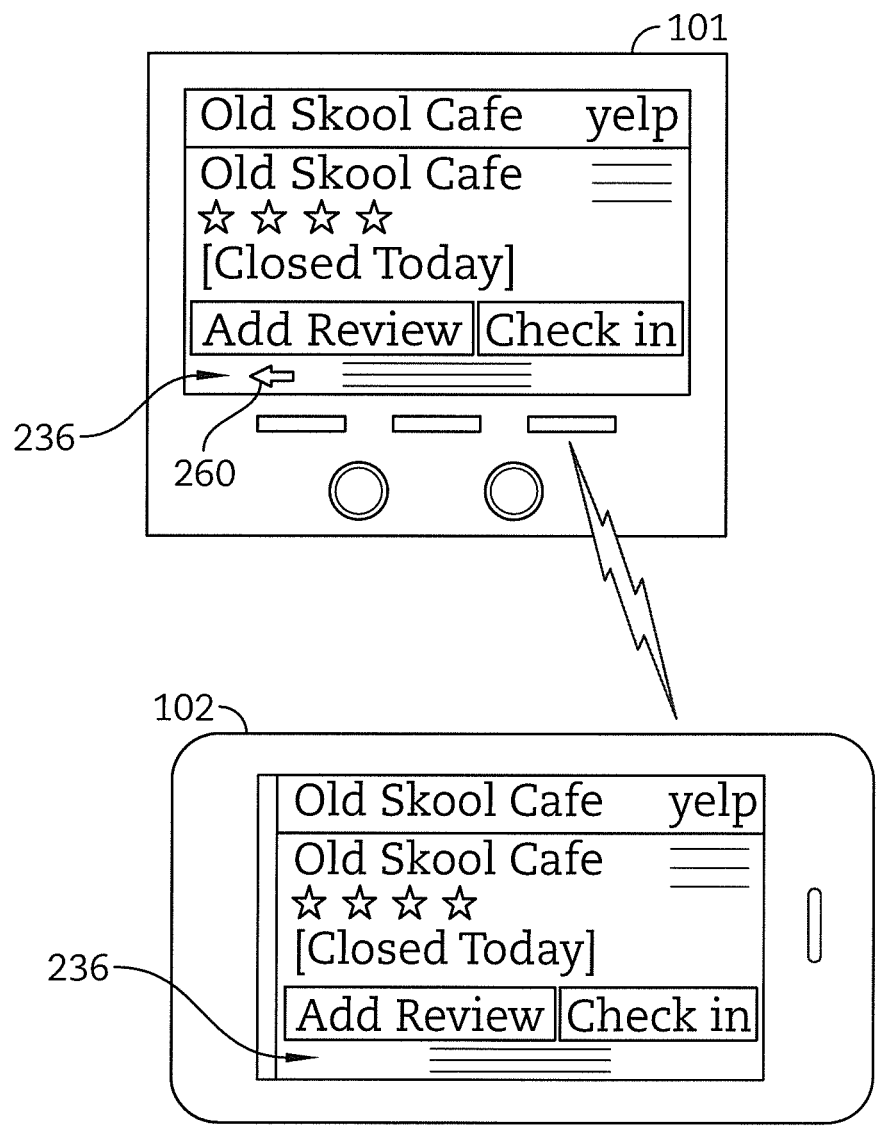

FIG. 2D shows that the mobile device 202 has rendered the application context 236, and that the application context 236 has been mirrored onto the head unit 201. The application context 236 consists of the restaurant page within the mobile review and recommendation application 246a. Through the deep link, the mobile review and recommendation application 246a automatically navigated to the application context 236 upon launch. The application context 236 was then mirrored onto the head unit 201 using the mirroring technology. Through application context 236, the user has access to additional information and functionality that was not available through in-vehicle software, such as customer reviews, the ability to check-in, etc.

One other advantage of the system 200 can be seen by returning attention to FIG. 2A. As mentioned, the mobile music application icon 244b may include a state indicator 245, which in this example is a "Playing" indicator. The mobile review and recommendation application icon 246b may include a notification indicator 247. The state indicator 245 conveys the state of an application. In the present example of a mobile music application 244a, states may include "Playing," "Paused," "Muted," and the like. The notification indicator 247 may provide notifications from a mobile application. In the present example of a mobile review and recommendation application 246a, the notification indicator 247 may indicate that the mobile review and recommendation application 246a has identified a top-rated restaurant in the immediate vicinity of the vehicle. The state indicator 245 and the notification indicator 247 may be associated with deep links. For example, by selecting the state indicator 245, a deep link may be followed such that the mobile music application 244a may be invoked on the mobile device 202 and may navigate directly to an application context in which a user may change the state of the mobile music application 244a from "Playing" to a different state. That application context may be mirrored onto the head unit 201 using the mirroring technology. Similarly, by selecting the notification indicator 247, a deep link may be followed such that the mobile review and recommendation application 246a is invoked on the mobile device 202 and may navigate directly to an application context showing a page for the top-rated restaurant that was identified by the notification indicator 247. Additional details on how deep links may be used to provide such functionality will be described in more detail below.

As exemplified by this overview, embodiments of the present disclosure provide a solution to the technical problems disclosed above. In one aspect, functionality from mobile applications stored on the mobile device 202 can be made accessible through icons 242b, 244b, and 246b that are displayed alongside icons 210b, 215b, and 220b associated with functionality for in-vehicle applications. This provides an integrated user experience through which functionality from both mobile applications and in-vehicle applications can be accessed from a common user interface and in accordance with a common graphical scheme.

In another aspect, the present disclosure provides functionality by which a user is able to access functionality from a mobile application directly from within an application context provided by an in-vehicle application. In the example above, the user was able to access application contexts of the mobile review and recommendation application 246a through a button 237 that was rendered as part of the in-vehicle navigation application 215a.

In another aspect, the present disclosure provides functionality by which a user can directly access an application context of interest in a mobile application that ordinarily would require a user to navigate through many intermediate screens.

Figure 3:
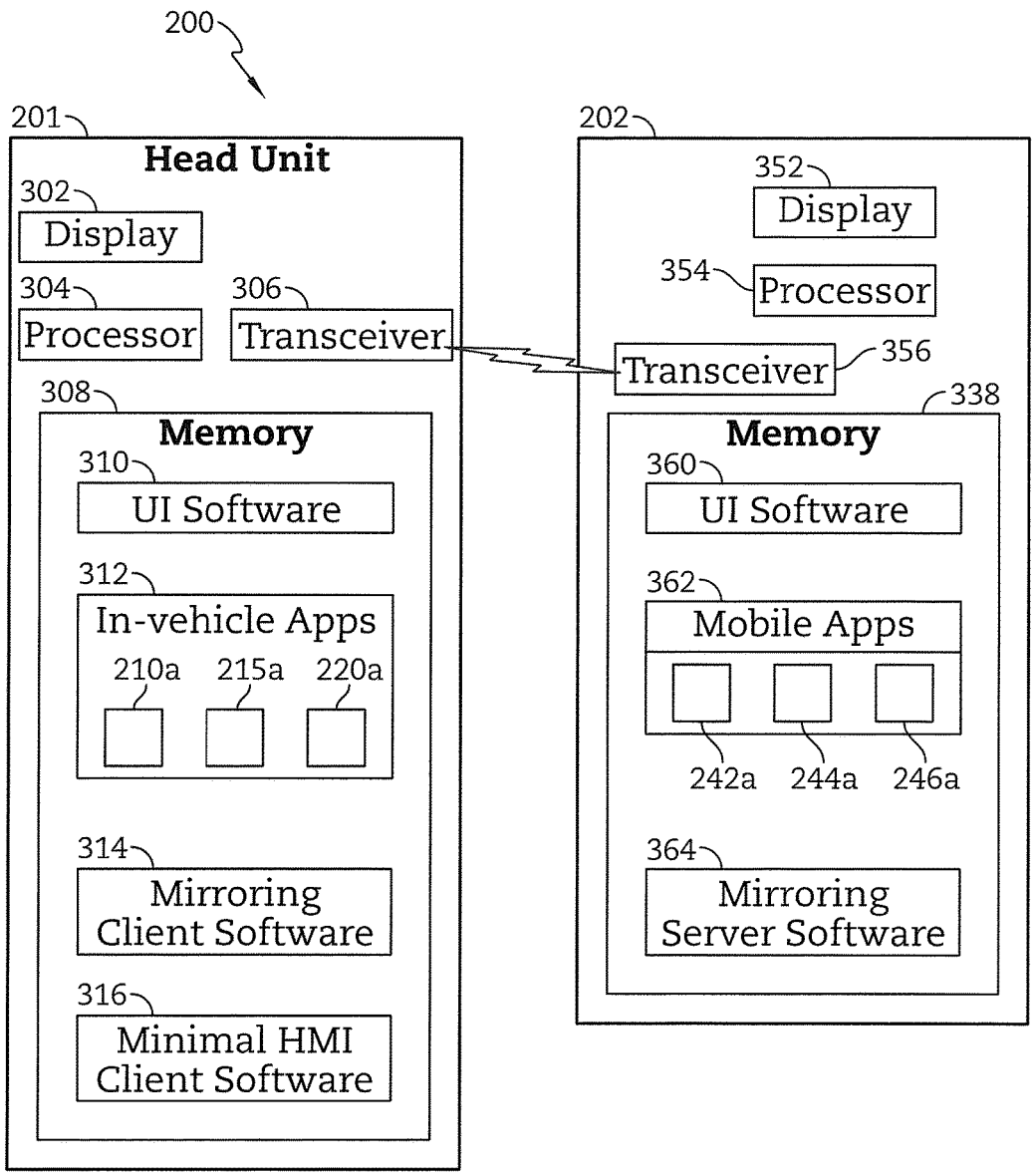
FIG. 3 shows internal system components of a head unit and a mobile device in accordance with the present disclosure.
Figure 4:
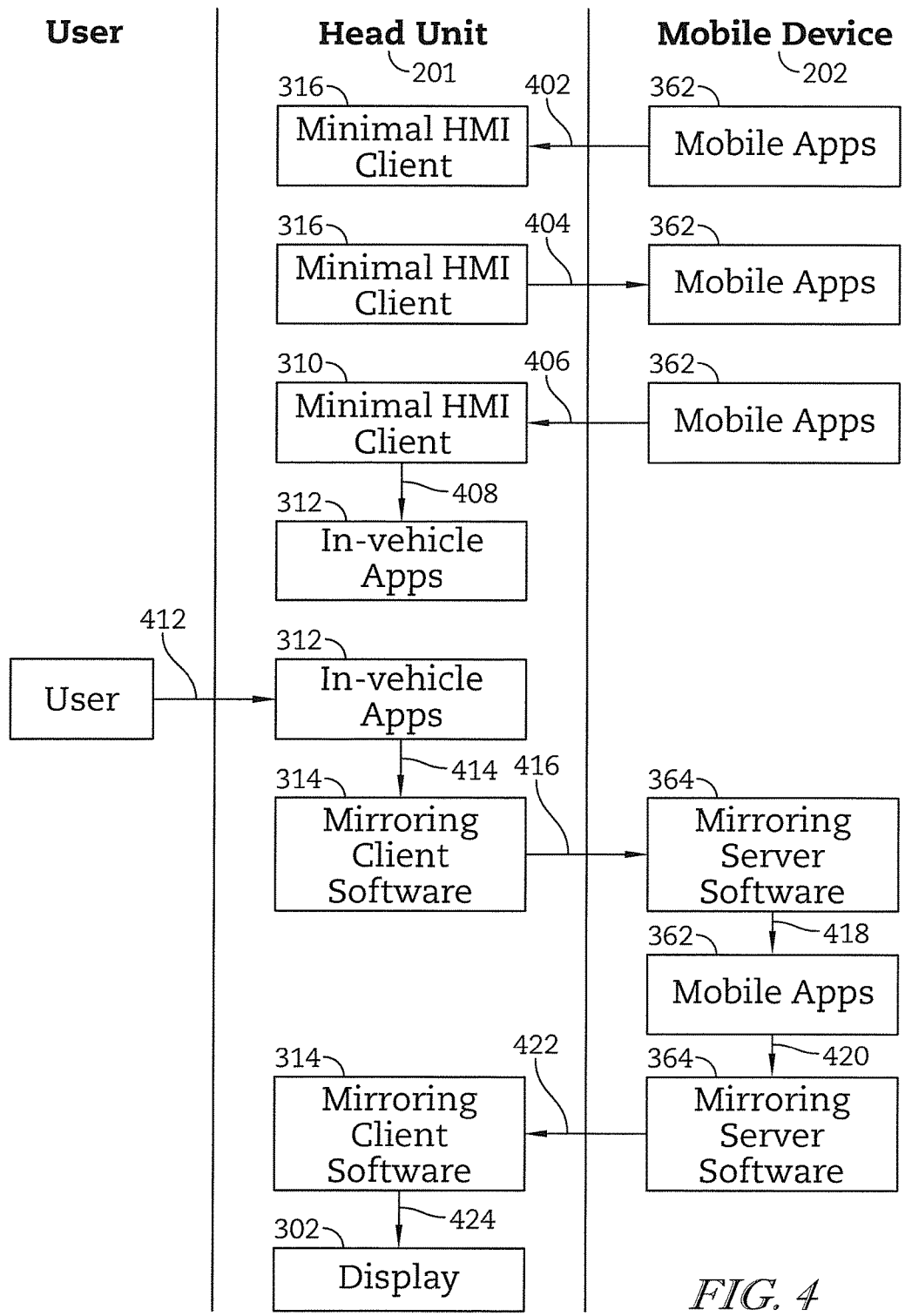
FIG. 4 shows a timing sequence diagram depicting communication exchanges between head unit software and mobile device software in accordance with the present disclosure.

A more detailed discussion of illustrative systems, components, and methodologies that can implement the above-summarized functionality will be provided in connection with FIGS. 3-4.

FIG. 3 shows that the head unit 201 includes a display 302, a processor 304, a transceiver 306, and a memory 308. The memory 308 further includes user interface software 310, in-vehicle applications 312, mirroring client software 314, and minimal Human-Machine-Interface ("HMI") client software 316.

The display 302 can be any display suitable for use in displaying information or entertainment features to a user. The display 302 may include a touch screen interface through which a user can interact with graphical icons rendered on the display 302 using gestures. Illustrative embodiments of the system 200 may also include other types of user controls for interacting with graphical icons, such as buttons, knobs, and dials located on a steering wheel or dashboard.

The user interface software 310 includes application code that renders user interface screens on the display 302. The user interface software 310 may include application code that is native to the head unit 201, in that it is stored in the memory 308 of the head unit 201 and executed on the processor 304 of the head unit 201. The user interface software 310 provides a graphical scheme that is native to the head unit 201. For example, the user interface software 310 may be configured to provide a certain look and feel, such as a brand-specific look and feel, for user interface screens rendered on the display 302. Generally, however, the look and feel provided by the graphical scheme can take on a wide variety of forms and may be chosen by the car manufacturer and/or head unit manufacturer. The user interface software 310 may be provided as part of an operating system (not shown) being executed by the processor 304. In operation, the application code associated with the user interface software 310 is executed on the processor 304, upon which user interface screens are rendered on the display 302.

The in-vehicle applications 312 include applications that are native to the head unit 201, in that they are stored in the memory 308 of the head unit 201 and have associated application code that is executed on the processor 304 of the head unit 201. In this illustrative embodiment, the in-vehicle applications 312 include an in-vehicle audio application 210a that may enable a user to operate and configure in-vehicle audio capabilities, such as input, volume, etc., an in-vehicle navigation application 215a, which may enable a user to obtain driving directions or other map-related information, and an in-vehicle settings application 220a through which a user can manipulate system settings associated with the head unit 201.

These in-vehicle applications are exemplary only, and any in-vehicle applications suitable for a vehicle head unit may be in accordance with the present disclosure.

The memory 308 also includes mirroring client software 314. The mirroring client software 314 sends requests and receives responses from mirroring server software 364 located on the mobile device 202, to be discussed below. The mirroring client software 314 and the mirroring server software 364 may operate in accordance with a particular mirroring technology. Exemplary mirroring technologies include MIRRORLINK™, GOOGLE™ AUTO LINK™, and APPLE™ CARPLAY™, but any technology capable of reproducing an application context from a mobile application on a mobile device onto a vehicle head unit may be in accordance with the present disclosure.

The memory 308 also includes minimal HMI client software 316. Generally, the minimal HMI client software 316 implements a minimal HMI protocol by which the head unit 201 can receive certain content from mobile applications 362 stored on the mobile device 202. Using the minimal HMI protocol, the head unit 201 can display certain content from the mobile applications 362 within application contexts of in-vehicle software. The minimal HMI client software 316 and associated minimal HMI protocol will be discussed in more detail below.

Turning to the mobile device 202, the mobile device 202 may be an APPLE™ IPHONE™, a mobile smartphone that uses an ANDROID™ operating system, a mobile smartphone that uses a MICROSOFT™ WINDOWS™-based operating system, or any of various other mobile computing devices that may or may not include mobile telephone functionality. Examples can include a personal digital assistant (PDA), a tablet computer, netbook computer, laptop computer, media viewer, or other computing resource containing at least a processor and a data storage, such as a static or dynamic memory, magnetic or optical disc drive, or the like.

The mobile device 202 includes a display 352, a transceiver 356, a processor 354, and a memory 358. The memory 358 further includes user interface software 360, mobile applications 362, and mirroring server software 364.

The display 352 can be any display suitable for use in a mobile device, and may be a touch screen interface through which a user can interact with graphical icons rendered on the display 352 through gestures. The user interface software 360 may include application code that is native to the mobile device 202, in that it is stored in the memory 338 of the mobile device 202 and executed on the processor 354 of the mobile device 202. The user interface software 360 may provide a graphical scheme that is native to the mobile device 202. For example, the user interface software 360 may be provided as part of an operating system (not shown) of the mobile device 202 (e.g., iOS™, ANDROID™, etc.), such as through operating system application programming interfaces or toolkits that the mobile applications 362 can invoke. This enables the mobile applications 362 to provide user interfaces that are in accordance with a graphical scheme for that operating system (e.g., iOS™, ANDROID™, etc.).

The mobile applications 362 include applications that are native to the mobile device 202, in that they are stored in the memory 358 of the mobile device 202 and have application code that is executed on the processor 354 of the mobile device 202. In the depicted example, the mobile applications 362 include a gas price search application 242a (e.g., GASBUDDY™), a music application 244a (e.g., PANDORA™), and a review and recommendation application 246a (e.g., YELP™).

However, these applications are exemplary only, and any mobile application may be within the scope of the present disclosure.

The memory 358 also includes mirroring server software 364. The mirroring server software 364 receives requests from the mirroring client software 314 and services those requests in accordance with a particular mirroring technology. As explained, exemplary mirroring technologies include MIRRORLINK™, GOOGLE™ AUTO LINK™, and APPLE™ CARPLAY™. However, any technology capable of reproducing an application context from a mobile application onto a vehicle head unit may be in accordance with the present disclosure.

The head unit 201 and the mobile device 202 communicate through respective transceivers 306 and 356. The transceivers 306 and 356 may establish communications through an air interface, such as WiFi, Bluetooth, or near field communications (NFC) interface. Alternatively, the transceivers 306 and 356 may communicate using a wired interface, such as using a USB cable inserted into ports of the mobile device 202 and head unit 201, or by placing the mobile device 202 into a docking station or cradle provided for that purpose.

FIG. 4 shows a timing sequence diagram 400 depicting communication exchanges between the head unit 201 and the mobile device 202 in accordance with the present disclosure. Reference will also be made in the ensuing discussion to FIGS. 2A-2D.

The timing sequence diagram begins with operation 402, in which the mobile applications 362 advertise that they have services that can be provided to in-vehicle software of the head unit 201. The head unit 201 receives the announcement of advertised services via the minimal HMI client software 316. In operation 404, the minimal HMI client software 316 requests content from the mobile applications 362. In operation 406, the mobile applications 362 receive the request and, in response, deliver content to the minimal HMI client 316 in accordance with a minimal HMI protocol.

More particularly, a minimal HMI protocol is used by the mobile applications 362 to communicate selected items of information to the head unit 201. The selected items of information may include important application functionality, selected informational content, programmatic abstractions, graphics, or other content that the head unit 201 can receive and render within application contexts of the in-vehicle applications 312. For example, icons for mobile applications (e.g., the mobile application icons 242b, 244b, and 246b depicted in FIG. 2A) may be communicated by the mobile applications 362 using the minimal HMI protocol to the head unit 201 for rendering by in-vehicle software as part of the home screen 205 (FIG. 2A). As another example, information appearing within the application context 235 of FIG. 2C, showing selected information about a restaurant, may be communicated by the mobile YELP™ application 246a for use by the in-vehicle navigation application 215a. As still another example, the points of interest icons 232 and 234 shown in FIG. 2B may be communicated by the mobile YELP™ application 246a for use by the in-vehicle navigation application 215a.

As explained, in operation 402, the mobile applications 362 deliver content to the HMI client 316 in accordance with the HMI protocol. The HMI protocol may be an Extensible Markup Language (XML) description transmitted using HTTP. In such an implementation, the mobile applications 362 encapsulate content in fields in accordance with a schema, and the minimal HMI client 316 is configured to parse the received information according to the schema. Alternatively, the HMI protocol may be a proprietary protocol defined by an automaker for exchanging HMI descriptions between the mobile applications 362 and the head unit 201. More generally, any protocol for transmitting select information from the mobile applications 362 to the head unit 201 may be in accordance with the present disclosure.

Continuing with the operations shown in FIG. 4, in operation 408, the minimal HMI client 316 transmits the content it received to in-vehicle applications 312 for rendering and display. For example, in-vehicle software renders the mobile application icons 242b, 244b, and 246b. Similarly, the in-vehicle navigation application 215a may render the point of interest icons 232 and 234 or the application context 235 showing selected information about a restaurant of interest. The in-vehicle applications 312 may use any number of approaches for rendering the content received by the minimal HMI client 316. In one implementation, the information received by the minimal HMI client 316 may include programmatic widgets that the in-vehicle applications 312 render in appropriate application context locations.

As explained, the content from the mobile applications 362 transmitted through the minimal HMI protocol may be rendered in an appropriate in-vehicle application context. A car manufacturer may determine where to place the content according to a variety of methodologies. Generally, the car manufacturer will place the content at locations within in-vehicle application contexts where the content will enrich the built-in feature set provided by the in-vehicle software. In illustrative embodiments, the application context could be specified by using separate communication channels or addresses per application context. For example, the head unit may provide separate communication channels (e.g., URLs when using HTTP communication, ports when using TCP sockets, etc.) for information of different kinds. By way of example, one channel may provide information for icons or applications to appear on the home screen 205 of the head unit 201, while another channel may provide information on points of interest for use in the in-vehicle navigation application 215a. Depending on the channel over which information is received, it may be processed differently by the head unit 201, including being rendered in different respective ways or on different respective screens.

In another illustrative embodiment, the mobile applications 362 may send an identifier indicating the appropriate in-vehicle application context for the content. For example, an identifier of "1" may indicate a navigation screen, an identifier of "2" may indicate a media screen, an identifier of "3" may indicate a car setup screen, etc. By way of example, a restaurant review application such as the mobile YELP application 246a may provide, as content transmitted through the minimal HMI protocol, a list of top-rated restaurants in the locale of the current vehicle position. The restaurants could be shown as points of interest icons 232 and 234 within the application context 230, as depicted in FIG. 2B. As another example, a mobile audio streaming application (e.g. SPOTIFY™) could send information about a currently streamed song (e.g. artiest, album, title, release date, tracktime, features for "like", "unlike", or "add to playlist" functionality, etc.). This additional information could be placed in an in-vehicle application context associated with the in-vehicle media application 210a. Thus, for example, "Spotify" could be an audio source alongside in-vehicle audio sources, such as CD, SO, USB, FM, AM, etc.

As still another example, head units often provide a "home screen" such as the home screen 205 depicted in FIG. 2A. Mobile applications 362 could transmit graphical icons providing shortcuts to those mobile applications 362 for inclusion on the home screen 205. As shown in this example, mobile application icons 242b, 244b, and 246b exist on the home screen 205. This enables the "home screen," which conventionally provides links to in-vehicle features, to be enhanced with links to mobile applications.

Using a minimal HMI protocol for conveying information from the mobile applications 362 to the head unit 201 offers several advantages. For example, it enables the head unit 201 to render content from the mobile applications 362 in accordance with the graphical scheme native to the head unit 201. As another example, minimal HMI protocols offer improved execution time, because they transfer selected content through light-weight modes, such as XML. As still another example, a minimal HMI protocol enables transmission of additional information within the transmitted files (e.g., within XML fields) that enables additional information to be embedded within screens displayed by the head unit 201.

As explained, however, there are instances in which a user may want to access the full functionality of the mobile applications 362 rather than just information provided through the minimal HMI protocol. Thus, the data format set forth by the minimal HMI protocol may be extended to enable mobile applications 362 to transmit deep links to the head unit 201. For example, if the HMI protocol is implemented as an XML interface, the schema defining the XML interface may include a field that can encapsulate deep links. Accordingly, systems in accordance with the present disclosures provide both the advantages of a minimal HMI protocol while also enabling other specific application contexts from within mobile applications to be accessible via mirroring technologies.

A deep link provides a shortcut into a specific application context of one of the mobile applications 362. For example, a deep link may encode required actions that a mobile application 362 should automatically take upon launch to arrive at a specific application context of interest, without requiring a user to manually step through intervening screens to arrive at the application context of interest. As one example, a deep link may identify a specific email within a mobile email application. As another example, a deep link may identify a specific restaurant page within a mobile restaurant review application.

The mobile applications 362 may register a deep link with the head unit 201 in a variety of ways, such as by indicating that the deep link should be associated with a particular graphical icon communicated by way of the minimal HMI, by indicating that the deep link should be placed in particular application contexts of particular in-vehicle applications, by indicating that the deep link should simply be followed automatically if the vehicle is in a particular state, and other alternatives that will be discussed below.

In the illustrative example that will be discussed in connection with operations 412-424, the information communicated by the mobile applications 362 via the minimal HMI protocol may include deep links that are associated with graphical icons. By way of overview, the graphical icons may be displayed within in-vehicle applications 312, while the associated deep links point to application contexts of the mobile applications 362. When a user selects a graphical icon having an associated deep link, the head unit 201 will invoke a mirroring technology (e.g., MIRRORLINK™, GOOGLE™ AUTO LINK™, APPLE™ CARPLAY™, or others) and establish communications with the mobile device 202 in accordance with that mirroring technology. The mirroring technology will invoke the one of the mobile applications 362 identified by the deep link and cause that mobile application 362 to navigate to the application context identified by the deep link. The resulting application context of the mobile application 362 will be rendered on the display 352 of the mobile device 202. The mirroring technology will then mirror the resulting application context onto the display 302 of the head unit 201.

Thus, in operation 412, a user selects a graphical icon that has an associated deep link. In this illustrative embodiment, the user may select the button 237 (FIG. 2C) having an associated deep link to an application context within the mobile review and recommendation application 246a. In operation 414, the in-vehicle application 312 transmits the deep link to the mirroring client software 314. The mirroring client software 314 may determine which specific mirroring technology should be activated by the head unit 201. For example, the mirroring client software 314 may select from among MIRRORLINK™, GOOGLE™ AUTO LINK™, APPLE™ CARPLAY™, or others.

In operation 416, the mirroring client software 314 establishes a connection with the mirroring server software 364 using the selected mirroring technology, and then sends the deep link to the mirroring server software 364. The deep link may be of the following form: mirrorLink://com.yelp/show-RestaurantDetails/124212

Here, "MIRRORLINK" is the selected mirroring technology, "com.yelp" identifies the requested mobile application 246a, and "showRestaurantDetails/124212" identifies the particular application context that the mobile review and recommendation application 246a should invoke—i.e., the restaurant details page for the restaurant having ID 124212.

In operation 418, the mirroring server software 364 follows the deep link to the application context identified by the deep link. Thus, using the example set forth above, the mirroring server software 364 would invoke the mobile review and recommendation application 246a, which would automatically navigate to the application context associated with "showRestaurantDetails/124212"—i.e., the application context 236 (FIG. 2D) containing information about the restaurant of interest.

In operation 420, the mobile device 202 renders the application context 236 on its display 352 using its user interface software 360. In operation 422, the mirroring server software 364 sends a mirrored copy of the application context 236 to the mirroring client software 314. In operation 424, the mirroring client software 314 renders the mirrored copy of the application context 236 on the display 302 of the head unit 201.

The example above, which centered on the mobile review and recommendation application 246a, was merely illustrative. To provide another example, the home screen 205 shown in FIG. 2A includes a mobile gas price search application icon 242b (e.g., for GASBUDDY™). This icon may be associated with a deep link registered by the mobile gas price search application 242a. When a user selects the mobile gas price search application icon 242b, the mobile gas price search application 242a may navigate to an application context identified by the deep link showing nearby gas stations and prices, and that application context may be mirrored onto the head unit 201.

Similarly, as previously explained, the home screen 205 shows that the mobile music application icon 244b may include a state indicator 245, which in this example is a "Playing" indicator. By selecting the state indicator 245, a deep link may be followed such that the mobile music application 244a may be invoked on the mobile device 202 and may navigate directly to an application context in which a user may change the state of the mobile music application 244a from "Playing" to a different state. That application context may be mirrored onto the display 302 of the head unit 201 using the mirroring technology.

As yet another example, the mobile review and recommendation application icon 246b may include a notification indicator 247, which may indicate that the mobile review and recommendation application 246a has identified a top-rated restaurant in the immediate vicinity of the vehicle. By selecting the notification indicator 247, a deep link may be followed such that the mobile review and recommendation application 246a is invoked on the mobile device 202 and may navigate directly to an application context showing a page for the top-rated restaurant that was identified by the notification indicator 247. This application context may be mirrored onto the display 302 of the head unit 201. Another example in which a notification indicator may be used is in connection with a mobile email application, which can provide a notification indicating that a new email has been received. In such an example, the notification may include a deep link to an application context in which the newly received email is presented to the user.

Generally, it should be understood that any mobile applications 362 may register deep links with the head unit 201 such that specific application contexts of the mobile applications 362 can be invoked and mirrored onto the head unit 201 by selecting deep links that appear within in-vehicle application contexts. Moreover, it is also possible that a given mobile application may register multiple deep links. For example, the restaurant review and recommendation application 246a may contribute an icon with an associated deep link to the home screen 205 of the head unit 201 to list nearby restaurants and another icon with an associated deep link to list nearby bars. Each such icon along with its associated deep link will identify a different application context within the mobile restaurant and review application 246a.

As illustrated, the system 200 addresses above-described technical problems because functionality of mobile applications stored on the mobile device 202 may be integrated within application contexts of in-vehicle software. Moreover, a user may be able to access a specific mobile application context of interest with "one click" of a graphical icon that appears within an in-vehicle application.

As explained, the application context 236 shown in FIG. 2D is rendered by the mobile device 202 and mirrored onto the head unit 201. In illustrative embodiments, the head unit 201 may overlay a "back" button 260 onto the display 302 showing the mirrored application context 236. When a user selects the back button 260, the head unit 201 may invoke in-vehicle software to terminate the mirroring protocol connection between the head unit 201 and the mobile device 202, and close the mirroring client software 314. The head unit 201 may then return control of the display 302 to the in-vehicle navigation application 215a, which renders the application context that had appeared before the mirroring protocol connection was established in this example, the application context 235 shown in FIG. 2C.

Other illustrative embodiments may implement still other enhancements and alternatives to the system 200. In certain embodiments, after a user selects a graphical icon having an associated deep link, the head unit 201 invokes software to determine whether the user should be permitted to follow the deep link or whether access to the deep link should be blocked. This software may be implemented within the mirroring client software 314, which may make this determination before initiating a mirroring protocol connection with the mobile device 202. Alternatively, the determination may be made by the mirroring server software 364 or one of the mobile applications 362 that is the target of the deep link.

The determination may be based on safety considerations, user experience considerations, or other considerations. In certain embodiments, the determination is made based on a state of the vehicle. For example, if certain deep links would result in application contexts that would distract a driver, the mirroring client software 314 may block access to the deep link if the vehicle is moving, or if the vehicle speed exceeds a threshold. The threshold may be specified by the mobile applications 362. For example, one of the mobile applications 362 may impose a condition of "maximum travel speed of five miles per hour while using this application."

Other aspects of the driving situation may also be considered, such as whether it is daytime or night time, whether the vehicle is in the middle of a turn, etc. Alternatively, the determination could be made by evaluating a current mental state of the driver. This would prevent further driver distraction by disabling mirrored applications during difficult situations.

In still other embodiments, the determination of whether to follow or block a deep link may be based on enhancing user experience. For example, if following a deep link would cause audio output, the head unit 201 may be configured to delay following this deep link until any currently playing audio output has ceased.

In certain embodiments, the deep links may not contain final addresses to application contexts of the mobile applications 362, but instead may contain placeholders. When the time comes to follow a deep link, such as when a user selects a deep link, the head unit 201 may fill the placeholder with information as to complete the deep link. This enables the head unit 201 to create a deep link that is specific to a current state of the vehicle. It also enables the head unit 201 to pass information from the head unit 201 to the mobile device 202 that otherwise might require a separate communication channel.

For example, the mobile gas price search application 242a may enable users to search for gas stations and gas prices in a locale. In operation 406, the mobile gas price search application 242a may provide a deep link that identifies an application context of the mobile gas price search application 242a that shows search results for nearby gas stations. However, the deep link may include a placeholder for a type of fuel that the vehicle uses (e.g diesel, regular, electric vehicle). When a user selects the mobile gas price search application icon 242b, the head unit 201 may be configured to complete the deep link by inserting the specified type of fuel. When the completed deep link is followed, the mobile gas price search application 242a will navigate to an application context that shows search results for nearby gas stations offering the type of fuel. This provides an advantage that a user does not need to configure the mobile gas price search application 242a with a particular type of fuel; instead, this may be done automatically when a deep link is followed.

As another example, a car manufacturer could provide a mobile application containing owner manuals and other information about its vehicle models such an application may register with the head unit 201 a deep link having a placeholder. When the deep link is followed, the head unit 201 may complete the deep link with the actual vehicle model. Thus, the mobile application would display an application context specific to the vehicle model of interest. That application context would then be mirrored onto the head unit 201.

As explained above in connection with operation 412 of FIG. 4, a deep link may be followed when a user selects a graphical icon associated with a deep link. However, in other illustrative embodiments, a deep link may be triggered automatically by a change in the state of a vehicle or by an event. For example, the mobile gas price search application 242a may register a deep link with the head unit 201 along with a flag indicating that the deep link should be followed when the driving range for the car (determined based on remaining fuel) drops below a certain limit. When the vehicle's fuel drops below the limit, the head unit 201 will automatically follow the deep link such that the mobile gas price search application 242a is directed to an application context that shows nearby available gas stations and prices. That application context would then be mirrored onto the head unit 201.

As another example, one of the mobile applications 362 may search for car repair shops in a given locale. The mobile car repair application may register a deep link along with a flag indicating that the deep link should be followed in the event that the vehicle provides a warning or indicates that there is some type of failure (e.g., an exhaust sensor failure). The deep link would then be automatically invoked and would result in the mobile car repair application navigating to an application context that searches for and displays nearby car repair shops. That application context would then be mirrored onto the head unit 201.

As still another example, a mobile application may search for parking spots in a given locale. The mobile parking application may register a deep link along with a flag indicating that the deep link should be followed when the in-vehicle navigation application 215a indicates that the vehicle has reached its destination. At that time, the deep link would be automatically followed such that the mobile parking application will display an application context showing available parking in the locale of the vehicle. That application context would then be mirrored onto the head unit 201.

In still other example, deep links may be triggered when a vehicle approaches a geographic area or when the vehicle approaches a home address.

In certain illustrative embodiments, the deep link does not identify a specific mobile application at all. Instead, it may reference an abstract action or information provided by the mobile device 202. When the deep link is followed, the mobile device 202 may determine which of the mobile applications 362 should be invoked to provide an application context that is responsive to the deep link. For example, a deep link may indicate that the mobile device 202 should play all tracks of a particular musical artist (e.g., Blur). The deep link registered with the head unit 201 may take the form: mirrorLink://audioplayer/play?artist=Blur&title=any.

When the deep link is followed, the mobile device 202 can select a mobile music player application to perform the necessary actions so as to arrive at an application context in which the requested music is played.

In certain illustrative embodiments, deep links may be followed when a user presses a hardkey of the vehicle, rather than just graphical icons rendered on the display 302 of the head unit 201. For example, certain vehicles offer customizable hardkeys that the user can assign to built-in functions or settings of a head unit. When these hardkeys are pressed, corresponding functions are executed and/or settings are manipulated. Deep links could be registered to hardkeys such that a given hardkey could invoke a deep link. For example, certain head units have a hardkey configured to start a voice dialog. A deep link could be registered with the hardkey such that a long press on the hardkey would launch a voice search application context on the mobile device 202.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for providing a user with access to functionality of a mobile device, the system comprising:
a head unit for providing information and entertainment to the driver, having:
a processor;
an in-vehicle display;
in-vehicle software applications accessible to the user via the in-vehicle software applications;
a non-transitory data storage on which is stored computer code which, when executed on the processor, causes the head unit to provide a user interface for the in-vehicle software applications; and
user interface software that configures the user interface with a graphical scheme native to the head unit;
a communication interface providing communication between the head unit and a mobile device;
means for providing deep links to the head unit, wherein each of the deep links identifies a mobile software application stored on the mobile device and an application context available within the identified mobile software application;
means for enabling a user to select at least one of the deep links from within a user interface screen provided on the in-vehicle display using one of the in-vehicle software applications;
means for establishing a communication session using a mirroring protocol connection between the one of the in-vehicle software applications on the head unit and the mobile software application identified by the selected deep link; and
software for mirroring, under control of the mobile software application on the mobile device, an application context on the in-vehicle display which is also rendered on a display of the mobile device, wherein the mirrored application context is the application context identified by the selected deep link,
wherein the selected deep link includes encoded required actions that a mobile application should automatically take upon launch to arrive at a specific application context of interest without requiring the user to navigate through intervening screens to arrive at the specific application context of interest,
wherein the application context rendered on the display of the mobile device and mirrored on the in-vehicle display under the control of the mobile software application running on the mobile device is displayed on the in-vehicle display along with a navigation icon,
wherein the mobile applications on the mobile phone advertise services that can be provided to in-vehicle software of the head unit, and the head unit requests content from the mobile applications,
wherein, in response to the request for content, the mobile applications deliver content to the head unit in accordance with a HMI protocol so as to communicate selected items of information to the head unit encapsulated in fields in accordance with a schema, whereby the head unit parses the received information according to the schema,
wherein selection of the navigation icon by the user triggers the head unit to terminate the mirroring protocol connection between the head unit and the mobile software application identified by the deep link to return control to the head unit to provide the user interface for the in-vehicle software application on the in-vehicle display, and
wherein the data format set forth by the HMI protocol enables mobile applications to transmit deep links to the head unit, the HMI protocol is implemented as an XML interface, and the schema defining the XML interface include fields encapsulating deep links so as to enable specific application contexts from within mobile applications to be accessible via mirroring.

2. The in-vehicle system of claim 1, wherein the software for mirroring the application context includes client software that adheres to a mirroring protocol.

3. The in-vehicle system of claim 1, wherein the deep links identify application contexts available within the mobile software applications.

4. The in-vehicle system of claim 1, wherein the means for enabling a user to select at least one of the deep links comprises a user control for user selection of a graphical icon for the deep link, wherein the graphical icon is rendered by one of the in-vehicle software applications in accordance with the graphical scheme native to the head unit.

5. The in-vehicle system of claim 1, wherein the in-vehicle display shows graphical icons corresponding to the mobile software applications alongside graphical icons corresponding to in-vehicle software applications on a common user interface screen and in accordance with the graphical scheme native to the head unit.

6. An in-vehicle system for providing access to functionality of a mobile device, the system comprising:
a head unit having:
a processor;
an in-vehicle display;
in-vehicle software applications accessible to a user via the in-vehicle display; and
a non-transitory data storage on which is stored computer code which, when executed on the processor, causes the head unit to provide a user interface on the in-vehicle display;
a communication interface providing communication between the head unit and a mobile device;
software implementing a protocol by which the mobile device registers deep links with the head unit, wherein each of the deep links identifies a mobile software application stored on the mobile device and an application context within the identified mobile software application;
a user control by which a user can select at least one deep link from within a user interface screen provided on the in-vehicle display by one of the in-vehicle software applications; and
software implementing a mirroring protocol to establish a mirroring protocol connection to render, on the in-vehicle display, the application context identified by the selected deep link,
wherein the selected deep link includes encoded required actions that a mobile application should automatically take upon launch to arrive at a specific application context of interest without requiring the user to navigate through intervening screens to arrive at the specific application context of interest,
wherein the mobile applications on the mobile phone advertise services that can be provided to in-vehicle software of the head unit, and the head unit requests content from the mobile applications,
wherein, in response to the request for content, the mobile applications deliver content to the head unit in accordance with a HMI protocol so as to communicate selected items of information to the head unit encapsulated in fields in accordance with a schema, whereby the head unit parses the received information according to the schema,
wherein the application context rendered on the display of the mobile device and mirrored on the in-vehicle display under the control of the mobile software application on the mobile device is displayed on the in-vehicle display along with a navigation icon, wherein selection of the navigation icon by the user triggers in-vehicle software to terminate the mirroring protocol connection between the head unit and the mobile software application identified by the deep link to return control to the head unit to provide the user interface for the in-vehicle software application on the in-vehicle display, and
wherein the data format set forth by the HMI protocol enables mobile applications to transmit deep links to the head unit, the HMI protocol is implemented as an XML interface, and the schema defining the XML interface include fields encapsulating deep links so as to enable specific application contexts from within mobile applications to be accessible via mirroring.

7. The in-vehicle system of claim 6, wherein the software implementing the protocol that renders the application context identified by the deep link includes client software that adheres to a mirroring protocol.

8. The in-vehicle system of claim 6, wherein at least one of the deep links is associated with either or both of a graphical icon and a textual display for the mobile software application identified by the deep link.

9. The in-vehicle system of claim 8, wherein the either or both of a graphical icon and a textual display for the mobile software application is rendered by at least one of the in-vehicle software applications in accordance with a graphical scheme that is native to the head unit.

10. The in-vehicle system of claim 9, wherein the graphical icon represents a point of interest displayed within a mapping interface provided by an in-vehicle navigation application; and
the deep link associated with the graphical icon encodes instructions for one of the mobile software applications to navigate to a user interface screen containing information about the point of interest.

11. The in-vehicle system of claim 9, wherein the graphical icon corresponds to an audio application stored on the mobile device; and
the graphical icon corresponding to the audio application is displayed as an alternative to audio capabilities native to the head unit.

12. The in-vehicle system of claim 9, wherein the head unit determines the in-vehicle software application in which the graphical icon will be displayed based on information conveyed by the mobile software application.

13. The in-vehicle system of claim 6, further comprising software that monitors for assessing one or both of a state of a vehicle containing the in-vehicle system and a state of a driver driving the vehicle, and
software for determining whether to launch the mobile software application identified by the selected deep link based on an assessment of whether it is safe to launch the mobile software application.

14. The in-vehicle system of claim 6, wherein the selected deep link includes a placeholder in which the head unit can provide vehicle-specific information to the mobile software application corresponding to the selected deep link.

15. The in-vehicle system of claim 6, further comprising a monitor that determines a state of a vehicle containing the in-vehicle system, and
software for automatically invoking, responsive to the determined state of the vehicle, a deep link.

16. A method for providing functionality of a mobile device to an in-vehicle system, the method comprising:
providing a user interface on a head unit display,
configuring the user interface in accordance with a graphical scheme implemented by in-vehicle software;
receiving a communication in accordance with a software protocol from a mobile device, wherein the communication provides a deep link that identifies a mobile software application stored on the mobile device and an application context within the mobile software application;
enabling a user to select the deep link from within a user interface screen provided on the in-vehicle display by one of the in-vehicle software applications while interacting with in-vehicle software via the in-vehicle display;
establishing a communication session using a mirroring protocol connection between the head unit and the mobile software application identified by the selected deep link; and rendering under control of the mobile software application on the mobile device, the application context identified by the deep link on the head unit display, wherein the deep link includes encoded required actions that a mobile application should automatically take upon launch to arrive at a specific application context of interest without requiring the user to navigate through intervening screens to arrive at the specific application context of interest, wherein the mobile applications on the mobile phone advertise services that can be provided to in-vehicle software of the head unit, and the head unit requests content from the mobile applications, wherein, in response to the request for content, the mobile applications deliver content to the head unit in accordance with a HMI protocol so as to communicate selected items of information to the head unit encapsulated in fields in accordance with a schema, whereby the head unit parses the received information according to the schema, wherein the application context rendered on the display of the mobile device and mirrored on the in-vehicle display under the control of the mobile software application on the mobile device is displayed on the in-vehicle display along with a navigation icon, wherein selection of the navigation icon by the user triggers in-vehicle software to terminate the mirroring protocol connection between the head unit and the mobile software application identified by the deep link to return control to the head unit to provide the user interface for the in-vehicle software application on the in-vehicle display, and wherein the data format set forth by the HMI protocol enables mobile applications to transmit deep links to the head unit, the HMI protocol is implemented as an XML interface, and the schema defining the XML interface include fields encapsulating deep links so as to enable specific application contexts from within mobile applications to be accessible via mirroring.

17. The method of claim 16, wherein enabling a user to select the deep link comprises associating either or both of a graphical icon and a textual display with the deep link and enabling the user to select the either or both of a graphical icon and a textual display.

18. The method of claim 17, comprising displaying the either or both of a graphical icon and a textual display alongside graphical icons or textual displays for in-vehicle software applications.

19. The method of claim 16, comprising determining whether to follow the selected deep link based on an assessment of a state of a vehicle containing the in-vehicle system.

20. The method of claim 16, comprising automatically following a deep link based on an assessment of a state of a vehicle containing the in-vehicle system.

21. The in-vehicle system of claim 1, wherein following termination of the mirroring protocol connection, control of the in-vehicle display is returned to the head unit, which renders an application context displayed before the mirroring protocol connection was established.

22. The in-vehicle system of claim 1, wherein in response to user selection of a graphical icon having an associated deep link, the head unit invokes software to determine whether the user should be permitted to follow the deep link or whether access to the deep link should be blocked.

23. The in-vehicle system of claim 22, wherein the determination to block is based on at least one of safety considerations, user experience considerations, or a state of the vehicle.

24. The in-vehicle system of claim 23, wherein the state of the vehicle includes at least one of movement of the vehicle or vehicle speed exceeding a threshold.

25. The in-vehicle system of claim 6, wherein following termination of the mirroring protocol connection, control of the in-vehicle display is returned to the head unit, which renders an application context displayed before the mirroring protocol connection was established.

26. The in-vehicle system of claim 6, wherein in response to user selection of a graphical icon having an associated deep link, the head unit invokes software to determine whether the user should be permitted to follow the deep link or whether access to the deep link should be blocked.

27. The in-vehicle system of claim 26, wherein the determination to block is based on at least one of safety considerations, user experience considerations, or a state of the vehicle.

28. The in-vehicle system of claim 27, wherein the state of the vehicle includes at least one of movement of the vehicle or vehicle speed exceeding a threshold.

29. The method of claim 16, wherein following termination of the mirroring protocol connection, control of the in-vehicle display is returned to the head unit, which renders an application context displayed before the mirroring protocol connection was established.

30. The method of claim 16, wherein in response to user selection of a graphical icon having an associated deep link, the head unit invokes software to determine whether the user should be permitted to follow the deep link or whether access to the deep link should be blocked.

31. The method of claim 30, wherein the determination to block is based on at least one of safety considerations, user experience considerations, or a state of the vehicle.

32. The method of claim 30, wherein the state of the vehicle includes at least one of movement of the vehicle or vehicle speed exceeding a threshold.

* * * * *